United States Patent Office 2,880,476
Patented Apr. 7, 1959

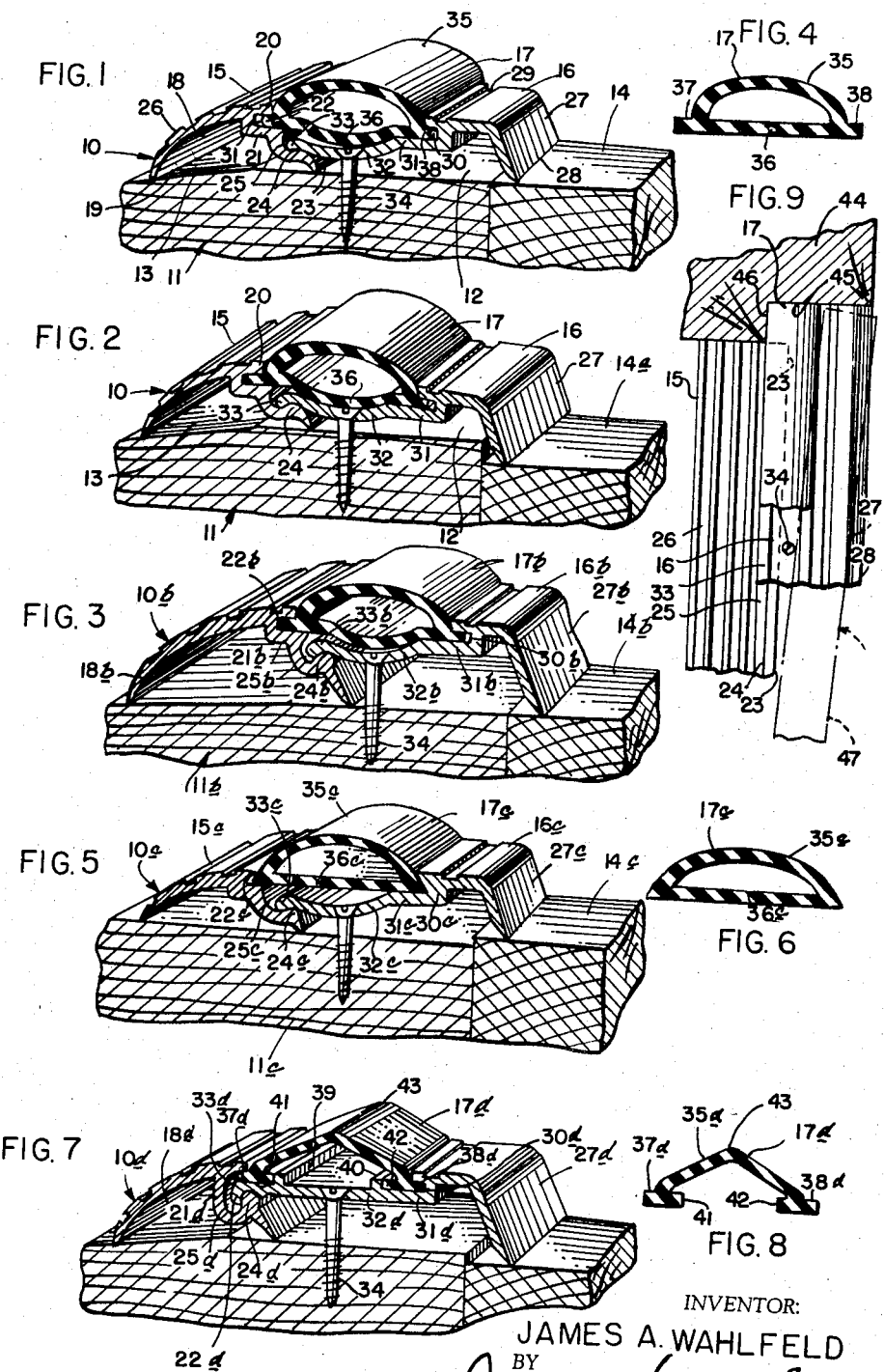

2,880,476

THRESHOLD

James A. Wahlfeld, Peoria, Ill.

Application April 17, 1957, Serial No. 653,378

13 Claims. (Cl. 20—64)

This invention relates to doorway sills, and more particularly to a threshold especially suited for use with outer doors for providing a weather strip or barrier therefor.

It is well known that considerable air leakage is present about closure doors, and is particularly troublesome where the doors provide an entrance between the outside and interior of a house or other enclosure, for the lack of a seal between the door and underlying floor permits the escape of warm air to the outside and, conversely, the entrance of cold exterior air. As a result, various threshold devices have been developed which serve to seal the space between a door and the underlying floor without interfering with the normal movement of the door. However, such devices are not universally applicable, are difficult to install, and frequently have sealing strips that are not easily mounted and which are readily knocked out of place when inadvertently kicked by one passing through the doorway.

As a consequence of these deficiencies in the known threshold devices, it is believed that an improved threshold structure would be a welcomed contribution to this art particularly one adjustable to any sill pitch and floor level, and the provision thereof is one of the objects of this invention. Another object of this invention is to provide a threshold structure that is easy to cut to size and mount in all doorways, and which has universal applicability in that it may be used with door frames where the floor-sections are inclined, or offset vertically with respect to a sill or each other to either increase or decrease the spacing between the door and various floor sections either opened or closed.

Still another object of the invention is in the provision of a threshold structure which utilizes as the sealing element, a hollow compressible strip (preferably of a resilient material such as rubber or one of the synthetic equivalents thereof) which is put in place by buckling or compressing the same transversely, whereupon the return thereof to its initial condition results in an interlock with rigid elements of the device. Yet another object is in the provision of a threshold having rigid channel sections and a resilient sealing strip of hollow cross section equipped with a bottom wall that deflects into a groovelike depression in one of the rigid sections, and in maintaining such deflected condition resists removal of the sealing strip from its interlocking relation with the channel sections. Additional objects and advantages of the invention will become apparent as the specification develops.

Embodiments of the invention are illustrated in the accompanying drawing, in which—

Figure 1 is a broken perspective view illustrating a section of a threshold device embodying the invention mounted on the sill of a doorway; Figure 2 is another broken perspective view illustrating a section of a threshold device embodying the invention, mounted on the sill of a doorway with the floor having a downwardly stepped portion; Figure 3 is still another broken perspective view illustrating a section of the inventive threshold device mounted on a doorway sill, but showing a modified form of threshold; Figure 4 is a transverse sectional view of the sealing strip employed in the thresholds of Figures 1 through 3; Figure 5 is yet another broken perspective view illustrating a section of the inventive threshold device mounted on the sill of a doorway with the floor having an upwardly stepped portion and flat sill, and in which a modified form of sealing strip is shown; Figure 6 is a transverse sectional view of the sealing strip used in the structure of Figure 5; Figure 7 is a broken perspective view showing a section of a modified form of threshold mounted in the sill of a doorway; Figure 8 is a transverse sectional view of the sealing strip used in the modified threshold structure of Figure 7; and Figure 9 is a broken top plan view of the threshold device illustrated in Figure 1 shown mounted in the sill of a doorway, and in which the relative position of a door is shown by the broken lines therein.

Figure 1 illustrates a threshold device designated in general with the numeral 10, shown mounted in the sill 11 of a doorway. The sill has a flat top surface 12 that underlies a door when it is closed, and an inclined face 13 on one side of the top surface 12. The sill 11 merges and is contiguous along the other side thereof with a floor section denoted with the numeral 14. It will be seen in Figure 1 that the top surface 12 of the sill is aligned with and forms an effective continuation of the top surface of the floor section 14.

The threshold 10 comprises a pair of channel sections 15 and 16 and a sealing strip 17 carried in an interlocking relation therewith. The section 15 has an arcuate wall 18 that terminates at its lower longitudinal edge 19 in adjacency with the inclined surface 13 of the sill of the door frame. If desired, the lower longitudinal edge 19 may be tapered to provide a line contact with the surface 13, whereby it may be slightly embedded therein when the threshold is mounted, as will be described hereinafter. The upper longitudinal edge 20 of the section 15 defines with a depending leg 21, a longitudinally extending recess 22; and inwardly of the recess 22, the leg 21 turns downwardly to define a lower edge 23 contiguous with the top surface 12 of the sill 11. The edge 23 may have a knife-like edge so that it can be embedded in the surface 12.

It will be evident that the longitudinally extending edges 19, 20 and 23 are in substantially parallel alignment, and also extending in alignment therewith is an arcuate shoulder 24 horizontally intermediate the edges 20 and 23, which merges with an arcuate hinge seat 25 that also extends longitudinally of the section 15 in parallel alignment with the longitudinal edges where downward pressure at 24 forces edges 19 and 23 downwardly. If desired, the outer surface of the section 15 may be provided with a plurality of ribs 26 which afford a roughened surface to provide relatively good traction as well as reinforcement longitudinally.

The channel section 16 has a depending leg 27 terminating in a lower longitudinally extending edge 28 which preferably is of tapered cross section to define an embeddable line contact with the top surface of the floor section 14. The generally horizontal top wall of the channel section 16 terminates at its inner end in a longitudinal extending edge 29 that defines a recess 30 with a channel wall 31 having an arcuate section 32 defining a longitudinally extending groove in the upper surface thereof and which terminates in a slightly arcuate hinge edge 33, which in configuration corresponds to that of the arcuate shoulder 24 of the section 15. It is apparent from Figure 1 that the arcuate hinge seat 25 has a greater arc of curvature than the hinge edge 33, whereupon the channel section 16 may articulate with respect to the channel section 15 about the hinge provided by the cooperative shoulder 24, edge 33 and seat 25.

The channel sections 15 and 16 are rigidly held in position along the sill 11 and floor 14 by a plurality of wood screws 34 which extend transversely through the arcuate section 32 of the channel wall 31 in longitudinally spaced relation. When the screws 34 are tightened, the channel section 16 is drawn downwardly toward the sill 11 and floor 14 whereby the edge 28 is brought into tight frictional engagement with the floor section 14, and the hinge edge 33 similarly engages the shoulder 24 of the channel section 15. As a result, the longitudinal edges 19 and 23 of the section 15 are brought into tight frictional engagement with the respective top surfaces 13 and 12 of the sill.

The seal element 17 comprises a hollow tubular member having a convex, top wall 35, a bottom wall 36 and laterally extending, longitudinal flanges 37 and 38 that are received, respectively, within the recesses 22 and 30 defined by the channel sections 15 and 16. By referring to Figure 4, it will be apparent that the bottom wall 36 of the sealing strip is ordinarily flat, but when mounted within the channel sections as shown in Figure 1, deflects into and conforms to the general configuration of the concave groove of the channel wall section 32. It may also be noted that the arcuate groove provided by the wall section 32 effectively recesses the heads of the screws 34 so that they do not interfere with the sealing strip 17 during the positioning thereof in the channel sections.

The sealing strip 17 may be formed from any suitable material, and has the characteristics of being both resilient and compressible whereupon the convex top wall 35 thereof is pressed downwardly when a door is closed thereagainst, but resiliently engages such door to provide a weather barrier or sealing relation therewith. The material, for example, may be natural or synthetic rubber, or it may be one of the various plastics which are known to have the characteristics stated.

The threshold device illustrated in Figure 2 is structurally identical to the one shown in Figure 1 and which has been described in detail, but Figure 2 illustrates the versatility of the threshold since it is there shown in use with an arrangement wherein the sill 11 has its top surface 12 above the top surface of the floor section 14a. Since with the exception of the floor section 14a, all of the other components are identical to those heretofore described, the same numerals are used in the designation thereof.

Figure 3 illustrates a slightly modified threshold structure in that the legs 21 and 27 are elongated, and the curvature of the wall 18 is accordingly greater. With the exception of these changes, the structural elements are the same as those heretofore described in detail and the function thereof is identical. Consequently, the same numerals are employed to denote the various components, but for purposes of differentiating the modified structure from the one heretofore described, each numeral has the suffix b added thereto.

The threshold structure illustrated in Figure 5 is substantially identical to those heretofore discussed. However, the character of the sealing strip has been altered slightly in that the laterally extending flanges 37 and 38 have been removed from the strip 17, and the arc defining the convex wall thereof has been carried to the lower surface of the bottom wall 36 thereof. In accordance with this change in the seal strip, the longitudinally extending recesses defined by the respective channel sections 15 and 16 are generally V-shaped so as to more suitably receive the longitudinal edges of the modified seal strip therein. To identify the various components of the modified threshold shown in Figure 5, the same numerals are again used, but the suffix c has been added to each. It may be noted further that the universal application of the threshold is shown also in Figure 5 in that the floor section 14c has its upper surface located above the top surface of the sill 11c.

Another modified threshold is shown in Figure 7, and the components thereof corresponding to those of the threshold structures heretofore described are designated by the letters d added to the same numerals. It may be noted that the threshold 10d corresponds in some respects more closely to the threshold 10b than to the others because of the elongated configuration of the legs 27d, 21d and the arcuate wall 18d. However, the section 32d of the channel wall 31d is flat rather than arcuate, and is equipped with spaced apart rails 39 and 40 which abut the inner edges of the inwardly extending, longitudinal flanges 41 and 42 of the sealing strip 17d. This strip has a top wall 35d that terminates in a crown 43 and, therefore, is not of arcuate configuration as is the top wall 35 of the other seal strips. Further, the seal strip 17d does not have a bottom wall except for the inwardly extending flanges 41 and 42.

Inspection of Figure 7 makes it clear that the flanges 42 and 38d are confined between the recess 30d and rail 40, while the flanges 41 and 37d are confined between the recess 22d and rail 39. It will be noted that the recess 22d merges or communicates with the hinge seat 25d, and consequently the flange 37d is frictionally gripped between the longitudinally extending edge 20d of the channel section 15d and the arcuate hinge shoulder 33d of the channel section 16d.

If a comparison is made between the threshold structure of Figure 7 and those of Figures 1 through 5, it will be noted that the cooperative hinge elements provided by the respective channel sections are spaced laterally of the center line of the threshold by a greater distance in the Figure 7 structure than in the structures of Figures 1 through 5. More pointedly, the hinge comprised of the elements 24d, 25d and 33d of the Figure 7 structure are disposed beneath the flange 37d and in substantial alignment therewith, while the corresponding hinge elements of the other structures are disposed inwardly of the respective flanges 37 and beneath the hollow interior of the sealing strip. In this respect, the structures of Figures 1 through 5 are preferred for they facilitate mounting of the threshold in the sill of a doorway.

This is made evident by considering Figure 9 which illustrates the threshold 10 in its cooperative relation with a door jamb 44. The door jamb 44, as is conventional, has a stepped configuration so as to provide a recess 45 terminating in a shoulder or face 46 against which the door 47 closes. For the most part, the channel section 15 extends to the left of the face 46, while the channel section 16 is toward the right of the face 46 and has an end portion received within the recess 45. This relationship is again made apparent in Figure 2 by the vertically extending broken lines which represent the location of the face 46 with respect to the threshold.

With the structures of Figures 1 through 5, and in the mounting thereof along the sill of a doorway, it is only necessary to make two cutting operations: First, the channel section 15 is cut transversely so as to fit snugly within the smaller dimension (that is, width) of the doorway; and the channel section 16 is similarly cut transversely so as to fit within the larger dimension of the doorway (that is, to fit snugly between the walls of the door jamb that define the recesses 45). The channel sections are then tightened in position by the screws 34, and the channel strip 35 is slipped into the channel sections so that the flanges 37 and 38 thereof are received within the longitudinally extending recesses 22 and 30. The sealing strip will, of course, first be cut to the same length as that of the channel section 16, and the portion of the flange 37 which would ordinarily abut the face 46 at each side of the door jamb is trimmed off. After the sealing strip 17 is in place, the arcuate top wall 35 may be pinched and a slight upward force applied thereto which has the effect of deforming the bottom wall 36 so that it seats within the arcuate groove defined by the wall portion 32 of the channel section 16. Thereafter, the wall 36 tends to maintain such concave configuration which is effective to resist inadvertent displacement of the sealing strip from its interlock with the channel sections.

If the threshold 10d is used, an extra cutting operation is required for, as is shown by the broken vertical lines, a portion (namely, the hinge end 33d of the channel section 16d) extends to the left of the face 46. Thus, not only must both of the channel sections be cut transversely, but the channel section 16d must be cut longitudinally at each end thereof so as to trim off the length of the hinge end 33d adjacent each face 46 of the door jamb.

In all of the threshold structures described, the channel sections are relatively pivotal or swingable about the cooperative hinge elements provided respectively thereby so as to accommodate sill and floor arrangements of various configurations. In each form of the structure, the sealing strip is readily mounted by compressing or pinching it transversely to insert the outwardly extending flanges thereof (or the longitudinal edges in the case of the strip 17c) into the channels therefor. With the structure of Figure 7, the respective inwardly and outwardly extending flanges may be fed into the recesses defined outwardly of the rails 39 and 40 by tilting the flanges during the insertion thereof. When in position, an interlocking relation is established between the channel sections and the sealing strips that firmly holds the sealing strips in place and resists inadvertent displacement thereof.

While in the foregoing specification embodiments of the invention have been set forth and described in considerable detail for purposes of illustration, it will be apparent to those skilled in the art that numerous changes may be made in those details without departing from the spirit and principles of the invention.

I claim:

1. In a threshold structure of the character described, a pair of articulated channel sections adapted to be secured along the sill of a doorway and defining respectively longitudinally extending, substantially parallel spaced recesses, one of said channel sections having an edge supported upon the other channel section intermediate said recesses, and a sealing strip of flexible resilient material having longitudinal edges receivable respectively in said recesses in an interlocking relation therewith, said sealing strip having an upwardly bowed top wall extending above said channel sections for cooperative sealing engagement with a door closed thereagainst.

2. In a threshold structure of the character described, a pair of elongated channel sections, one of which has an inner and an outer longitudinally extending edge adapted to abut the sill of a doorway, and the other of which has a remote longitudinally extending edge adapted to similarly abut the sill of a doorway and an inner wall adapted to rest against a portion of said one channel section to bear downwardly and constrain its inner and outer edges against the sill of a doorway, means intermediate said inner wall and remote edge for securing all three of said edges against the sill of a doorway, and a sealing strip covering the pivoted engagement and said intermediate means carried by said channel sections, said sealing strip being flexible and resilient and providing a wall portion extending upwardly above said channel sections for sealing engagement with a door closed thereagainst.

3. In a threshold structure of the character described, a pair of articulated channel sections adapted to be secured along the sill of a doorway and defining respectively longitudinally extending, substantially parallel spaced recesses opening towards each other, one of said channel sections having inner and outer longitudinally extending depending edges each adapted to abut the sill of a doorway, and the other of said channel sections having a remote longitudinally extending depending edge adapted to abut the sill of a doorway and an inner wall fulcrumed against a portion of said one channel section horizontally intermediate said inner and outer edges to bear downwardly thereon, means intermediate said inner wall and said remote edge engaging said other channel section for securing said other channel section in a downward direction to hold all three edges against the sill, and a sealing strip of flexible resilient material having longitudinal edges receivable respectively in said recesses in an interengaging relationship therewith, said sealing strip having an upwardly bowed top wall extending above said channel sections for cooperative sealing engagement with a door closed thereagainst.

4. The threshold of claim 2 in which said one mentioned channel section and the inner wall of the other channel section define cooperative hinge elements providing relative articulation of said channel sections.

5. The threshold of claim 4 in which said cooperative hinge elements are located above the inner longitudinal edge and below said sealing strip.

6. The threshold of claim 2 in which the inner wall of said second mentioned channel section has a concave groove extending longitudinally thereof, and in which said sealing strip is provided with a bottom wall deflectible into said groove.

7. In a threshold structure of the character described, a pair of elongated channel sections one of which has an inner and an outer longitudinally extending edge each adapted to abut the sill of a doorway and the other of which has an outer longitudinally extending edge adapted to similarly abut the sill of a doorway and an inner wall adapted to bear downwardly against a portion of said inner edge to constrain such inner edge and its channel section against the sill of a doorway, means for securing said second mentioned channel section to the sill of a doorway with the inner wall thereof bearing against such portion of said inner edge, said channel sections being provided respectively with facing, longitudinally extending recesses horizontally spaced on opposite sides of the first mentioned inner edge, and a sealing strip having longitudinally extending edges interlockingly received within the respective recesses and adapted to provide a sealing engagement with a door closed thereagainst.

8. The structure of claim 7 in which said sealing strip is provided with a flexible resilient top wall extending above said channel sections and is equipped with outwardly projecting, longitudinally extending flanges defining said longitudinally extending edges received within said recesses.

9. The structure of claim 8 in which said sealing strip is hollow and is provided with a bottom wall extending thereacross.

10. The structure of claim 8 in which the aforesaid inner wall is provided with a longitudinally extending concave groove, and in which the bottom wall of said sealing strip conforms to the concave configuration of said groove when the longitudinal edges of the sealing strip are received within said recesses.

11. The threshold structure of claim 7 in which the aforesaid inner wall is equipped with longitudinally extending rails respectively facing said recesses, and in which said sealing strip is provided along each longitudinal edge thereof with an inwardly and an outwardly extending flange, the outer flanges being confined within the recesses therefor by abutment of the respective rails with the inwardly extending flanges.

12. A threshold structure, comprising a first channel section having an arcuate wall portion terminating at its outer end in a longitudinally extending edge and at its inner end in a depending leg having an arcuate, longitudinally extending hinge seat therein, a second channel section terminating at its outer end in a longitudinally extending edge and having an inwardly extending wall provided with an arcuate longitudinally extending hinge receivable within said hinge seat, means for drawing said second channel section downwardly toward the sill of a doorway to constrain the same therein and to urge said hinge element downwardly upon said hinge seat to similarly constrain said first channel section, each of said channel sections being provided with a longitudinally extending recess in generally facing relation with each other, and a flexible resilient sealing strip of hollow configuration having longitudinally extending edges receivable respectively within said recesses for holding the sealing strip in position along said channel sections, said sealing strip having a top wall bowed upwardly above said channel sections for sealing engagement with a door closed thereagainst, said hinge seat and hinge element being oriented inwardly of an adjacent longitudinal edge of said sealing strip, said inwardly extending wall having a longitudinally extending groove therein adapted to receive the bottom wall of said sealing strip therein.

13. A threshold structure, comprising a first channel section having an arcuate wall portion terminating at its outer end in a longitudinally extending edge and at its inner end in a depending leg having an arcuate, longitudinally extending hinge seat therein, a second channel section terminating at its outer end in a longitudinally extending edge and having an inwardly extending wall provided with an arcuate longitudinally extending hinge receivable within said hinge seat, means for drawing said second channel section downwardly toward the sill of a doorway to constrain the same therein and to urge said hinge element downwardly upon said hinge seat to similarly constrain said first channel section, each of said channel sections being provided with a longitudinally extending recess in generally facing relation with each other, and a flexible resilient sealing strip of hollow configuration having longitudinally extending edges receivable respectively within said recesses for holding the sealing strip in position along said channel sections, said sealing strip having a top wall bowed upwardly above said channel sections for sealing engagement with a door closed thereagainst, said hinge seat and hinge element being disposed outwardly of the adjacent longitudinal edge of said sealing strip.

References Cited in the file of this patent

UNITED STATES PATENTS

| | | |
|---|---|---|
| 100,461 | St. Clair | Mar. 1, 1870 |
| 340,510 | Johnston | Apr. 20, 1886 |
| 721,510 | Funk | Feb. 24, 1903 |
| 2,188,049 | Kammerer | Jan. 23, 1940 |
| 2,718,677 | Cornell | Sept. 27, 1955 |